United States Patent [19]
Dawson

[11] Patent Number: 4,778,492
[45] Date of Patent: Oct. 18, 1988

[54] CONTINUOUS GAS TREATMENT METHOD AND APPARATUS FOR ADSORPTION PROCESSES

[75] Inventor: John E. Dawson, Summerland Key, Fla.

[73] Assignee: Advanced Separation Technologies Incorporated, Lakeland, Fla.

[21] Appl. No.: 16,575

[22] Filed: Feb. 19, 1987

[51] Int. Cl.⁴ .............................................. B01D 53/06
[52] U.S. Cl. ............................................. 55/78; 55/73; 55/181; 55/390
[58] Field of Search ................. 55/34, 60, 73, 77, 78, 55/99, 179, 181, 390

[56] References Cited

U.S. PATENT DOCUMENTS

| | | | |
|---|---|---|---|
| 1,602,500 | 10/1926 | Nuss | 55/181 X |
| 1,814,028 | 7/1931 | Egli | 55/179 |
| 2,507,607 | 5/1950 | Miller | 55/179 |
| 2,507,608 | 5/1950 | Miller | 55/181 |
| 2,617,986 | 11/1952 | Miller | 55/181 |
| 2,639,000 | 6/1951 | Edwards | 55/179 |
| 2,751,033 | 6/1956 | Miller | 55/181 |
| 2,861,651 | 11/1958 | Miller | 55/181 X |
| 3,201,921 | 8/1965 | Heyes | 55/179 X |
| 4,046,525 | 9/1977 | Matsuo et al. | 55/179 X |
| 4,522,726 | 6/1985 | Berry et al. | 55/78 X |
| 4,612,022 | 9/1986 | Berry | 55/78 X |

Primary Examiner—Robert Spitzer
Attorney, Agent, or Firm—Burns, Doane, Swecker & Mathis

[57] ABSTRACT

Apparatus designed to effect the continuous processing of gas mixtures for the selective removal of certain elements and constituents from the gases. A method is also disclosed by which the continuous process is carried out. A drum-shaped rotor unit has adsorbent carrying containers mounted about an axis. These containers rotate through a first circumferential zone in which gas processing occurs and a second circumferential zone in which regeneration occurs. This allows gas to constantly flow into the rotor unit at the first circumferential zone to undergo an adsorption process while also continuously providing regenerated adsorbent to the first circumferential zone.

20 Claims, 8 Drawing Sheets

Fig. 9

CONTINUOUS GAS TREATMENT METHOD AND APPARATUS FOR ADSORPTION PROCESSES

FIELD OF THE INVENTION

The invention generally relates to gas treatment methods and apparatus and, more particularly, is directed to a method and apparatus for the continuous processing of gases for selective removal of certain elements and constituents from the gases.

BACKGROUND OF THE INVENTION

Conventional gas adsorption methods and devices today employ either fixed or moving beds of adsorbent in processes separating sulfur dioxide from flue gases resulting from coal combustion in power plants. Such fixed or moving bed methods and devices are also used to remove hydrogen sulfide from sewage treatment plant off-gases and to remove toxic metals from smelter gases.

The use of a fixed bed is the dominant process whereby large, deep beds of adsorbent are arranged in vessels to provide sufficient capacity for the gases to be treated. Any number of vessels are used in parallel flow as required to provide the desired capacity and to allow for some of the vessels to be taken out of service when the adsorbent therein has become saturated with the products removed from the gases. When vessels are removed from service to regenerate the adsorbent, it is done either by removing the adsorbent from the vessels for external regeneration and replacing it with fresh adsorbent, or regenerating the adsorbent in place in the vessel by means of special accessories and appurtenances built into the vessels. Devices of this type are limited in size by economic considerations and are capable of processing only limited gas flow rates or gases with low concentrations of material to be removed in the incoming gas stream. For example, the size and number of vessels employed is limited by construction and shipping considerations, and typically are designed to handle roughly 10,000 cubic feet of gas flow per minute. The flow rate capable of being handled by any given fixed bed system is dependent, of course, on vessel size and the number of parallel vessels operational in the process at any given time. Concentration levels in fixed bed systems treating flue gases can range from 1,000 to 3,000 parts per million. An additional reason for this limited capacity of the adsorbent to remove material from the incoming gas flow is that the adsorbent becomes saturated frequently and must be repeatedly taken out of operation to undergo regeneration.

Where moving beds of adsorbent such as activated carbon are employed, the adsorbent is continually fed into an adsorption chamber by a special feeder and, after flowing downward through the chamber by gravity, is continually removed from the chamber by another special feeder and conveyed to other vessels where regeneration is carried out. Because the adsorbent is continually being moved, these moving bed devices suffer the drawback of a measurable loss of adsorbent through attrition. These devices have not yet been proven to be operationally reliable when demonstrated in this country.

U.S. Pat. No. 4,552,726 to Berry, et al. discloses an advanced separation device and method for the continuous treatment of fluid streams. This device is useful for the treatment of plural fluid streams, either by ion exchange or by other solid or fluid contacting operations. However, the equipment does not lend itself to the treatment of large volume gas adsorption separation because it is not amenable to the use of large gas ducts and gas-tight seals which are positioned between the ducts and the adsorption sections of the rotor in such a manner as to allow for minimal pressure losses in the gases as they flow through the adsorption sections and to provide for optimum gas distribution in the adsorbent beds.

There is, for example, a need for method and apparatus to remove sulfur and other harmful constituents from the flue gas of fossil fuel power plants. Due to the large flow rates and elevated temperatures, prior systems are expensive and inefficient.

It is therefore apparent that there is an urgent need for a continuous gas treatment method and apparatus employing an adsorption process which eliminates the abovementioned deficiencies in the prior art and which provides for efficient adsorption over a wide range of concentrations and flow rates in a truly continuous fashion requiring considerably reduced quantities of adsorbent materials than is required by either fixed or moving bed systems.

OBJECTS AND SUMMARY OF THE INVENTION

In view of the deficiencies of prior art methods and apparatus, as described above, it is an object of this invention to provide a method and apparatus for selectively removing components from a gas stream continuously and at a high flow rate.

Another object of this invention is to provide a method and apparatus for selectively removing components from a gas stream by means of an adsorbent bed that is continuously and efficiently regenerated.

A further object of this invention is to provide a method and apparatus for selectively removing components from a gas stream by adsorption that operates efficiently and effectively, without interruption.

These objects are accomplished in accordance with this invention by the method or process and apparatus wherein a continuous stream of gas is conducted through ducts in which the gas that is to be treated comes in contact with adsorbent material. The ducts are mounted for rotation in a drum that rotates about a horizontal axis. On the lower side of the drum, the ducts pass through a liquid bath for regenerating the adsorbent material. As the drum rotates, the upper side of the drum is above the surface of the liquid bath and the gas to be treated passes at a high flow rate through the ducts where it is contacted with the adsorbent material. Thus, the process proceeds continuously.

The apparatus of the invention preferably has a drum-shaped rotor unit that is mounted for rotation on a horizontal shaft. The rotor unit has enclosure shells and casings with connections to ductwork which allow for gas flow containment and distribution to adsorption sections of the rotor as well as retention and distribution of liquid regenerant solutions.

The method of continuously treating gas in an adsorption process in accordance with this invention includes the steps of continuously feeding gas that is to be treated into a compartment of the rotor, each compartment having adsorbent material therein, and rotating the rotor about its axis to expose successive compartments to the gas inlet while rotating previously employed compartments to a position where a regeneration operation is conducted. The apparatus is designed to allow for adsorption processes using various adsorption materials and is capable of removing selected materials from both small flow rates to extremely large flow rates, depending on the size of the apparatus. For example, an apparatus could be sized to accommodate a flow rate of 350,000 cubic feet per minute of flue gases from a combustion process of high sulfur coal and remove up to 3,000 parts per million of sulfur dioxide from the flue gases. The inventive apparatus and method allows desired constituents or impurities to be removed from the gas to be treated and provide for their subsequent removal from the adsorbent on a continuous basis. Accordingly, a continuous flow of gas can be treated by the method without the need to stop the process when the adsorbent becomes saturated with material adsorbed from gases passing through it.

BRIEF DESCRIPTION OF THE DRAWINGS

Preferred embodiments of the invention are illustrated in the accompanying drawings, in which.

DETAILED DESCRIPTION OF THE PREFERRED EMBODIMENTS

A first embodiment of an apparatus of the present invention is shown in FIGS. 1 to 9. As illustrated generally in FIG. 1, the apparatus 10 is provided for continuously carrying out a gas adsorption process and comprises an outer casing 20 which encloses a drum-shaped rotor unit 12, FIG. 4, having an outer circumference and being rotatable about a horizontal axis by a drive shaft 37.

The apparatus 10 also includes gas feeding and delivering ducts 14, 16 and a crossover duct 18. The gas feeding duct 14 directs gas that is to be treated into the rotor unit. The gas passes through adsorbent material carried in the rotor unit 12 and is then allowed to pass out of the rotor unit 12. At this stage, the gas may be redirected into the rotor unit 12 by the crossover duct 18 to be submitted to a second gas adsorption process. Finally, gas that has undergone two gas treatments passes out of the rotor unit 12 through the gas outlet duct 16.

Adsorbent material carried in the rotor unit 12 is exposed to untreated or once-treated gas only when the section of the rotor unit 12 holding that adsorbent material is adjacent the inlet, outlet and crossover ducts. This circumferential segment adjacent the central axis of the rotor unit which is exposed to the ducts 14, 16 and 18 is referred to as the gas treatment zone and extends in a clockwise direction from point 23 directly beneath inlet duct 14 on the circumference of the rotor unit in FIG. 4 to point 17 directly beneath the outlet duct 16.

Figure 4:
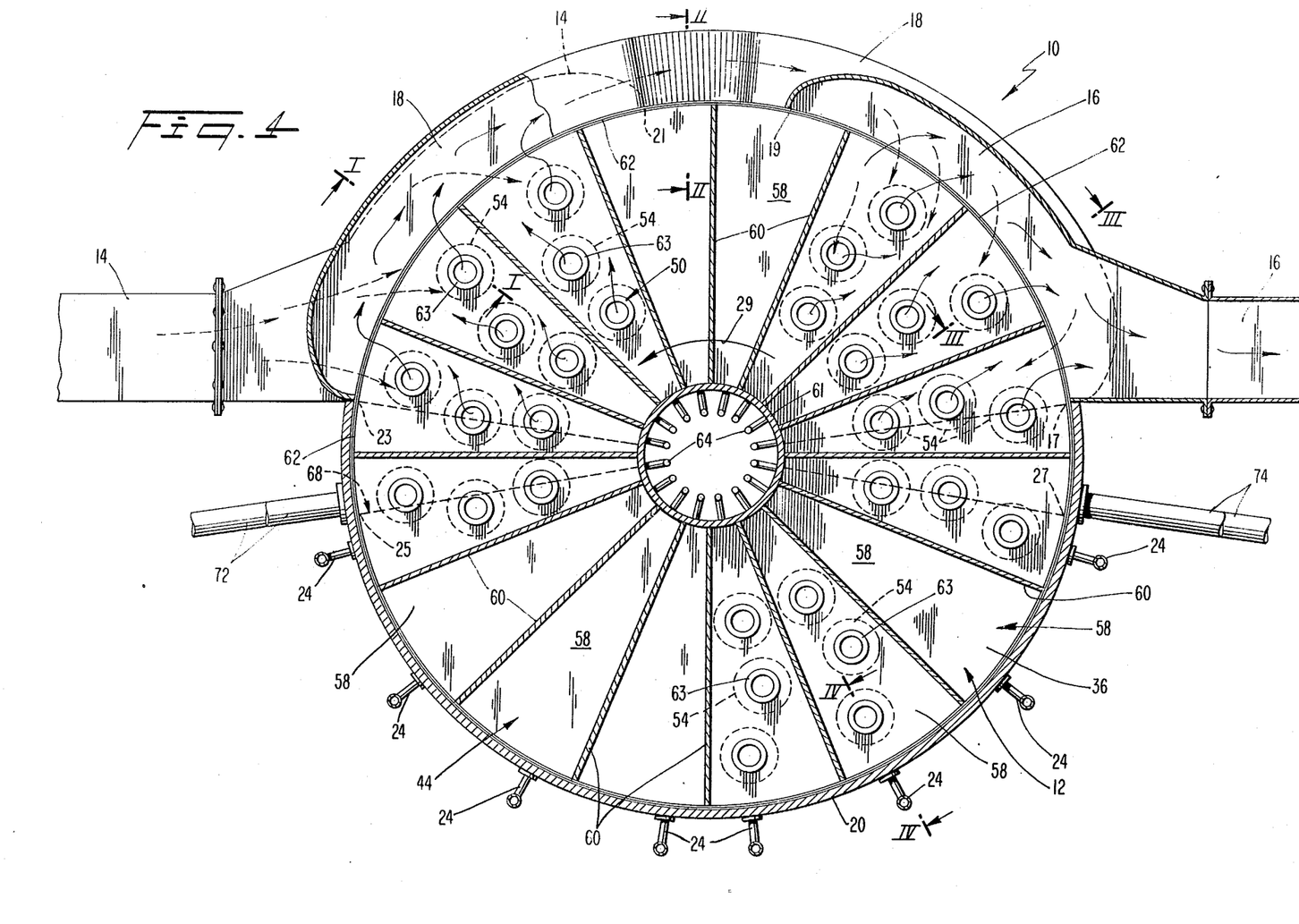
FIG. 4 is a side elevational view of the apparatus according to the first embodiment.

The fluid-tight casing 20 surrounding the rotor unit 12 includes drains 24 which are formed around the bottom surface of the shell and which can be opened and closed to control the fluid level in the portion of the rotor unit passing through the lower circumferential zone extending in a clockwise direction from point 27 in FIG. 4 to point 25. This zone is the regeneration zone and it is during rotation through this zone that adsorbent material, such as activated carbon, carried in the rotor unit is exposed to a regenerating solution such as water capable of removing desired constituents or impurities from the adsorbent material which were deposited in the material during the gas treatment process.

Figure 1:
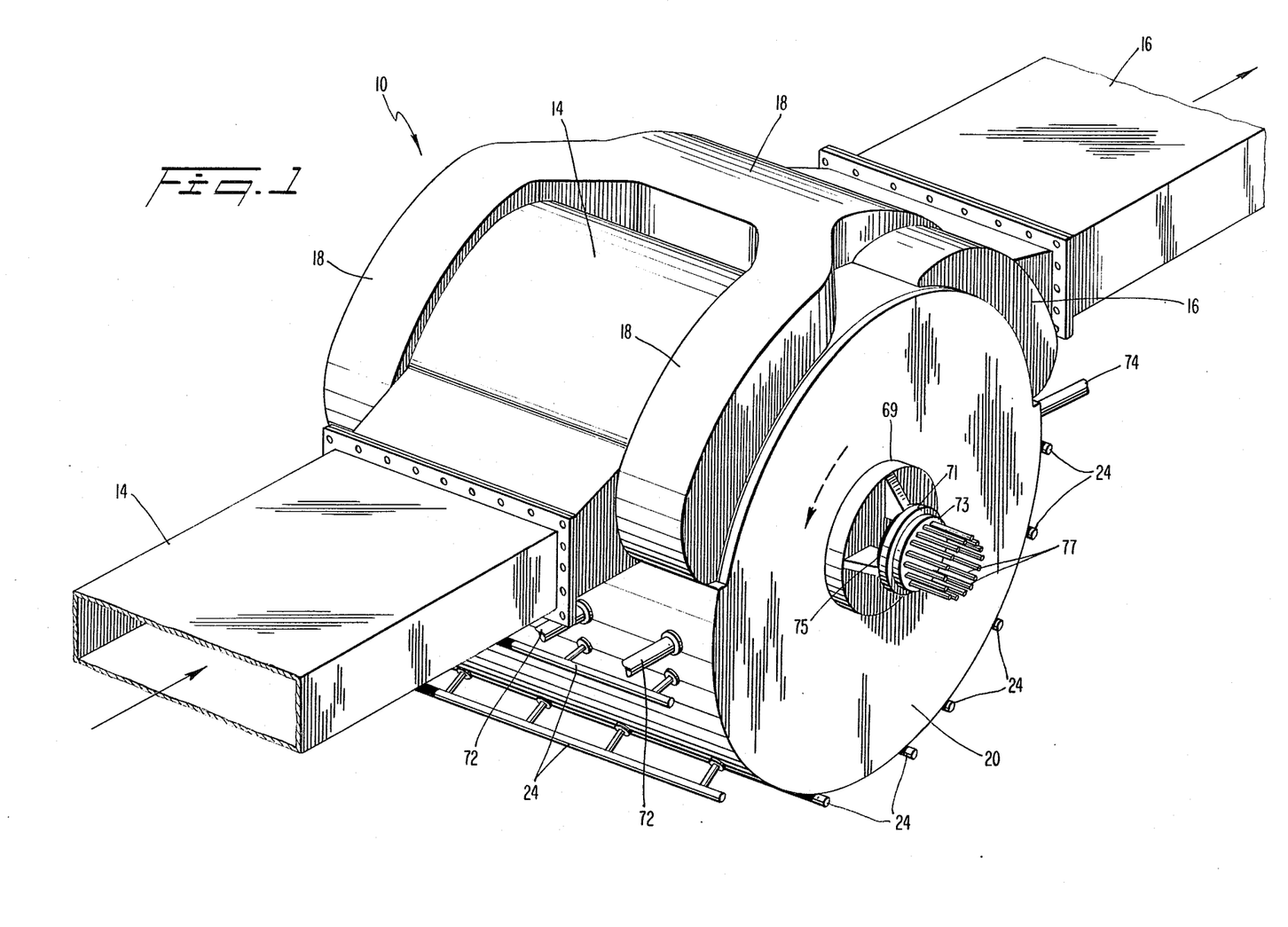
FIG. 1 is an isometric view of a first embodiment of the continuous gas adsorption separation apparatus.

Additional ducts 72, 74, shown in FIG. 1, may be provided to prepare the adsorbent material rotating into either the regeneration zone or the gas treatment zone in a manner to be more fully described below.

Figure 2:
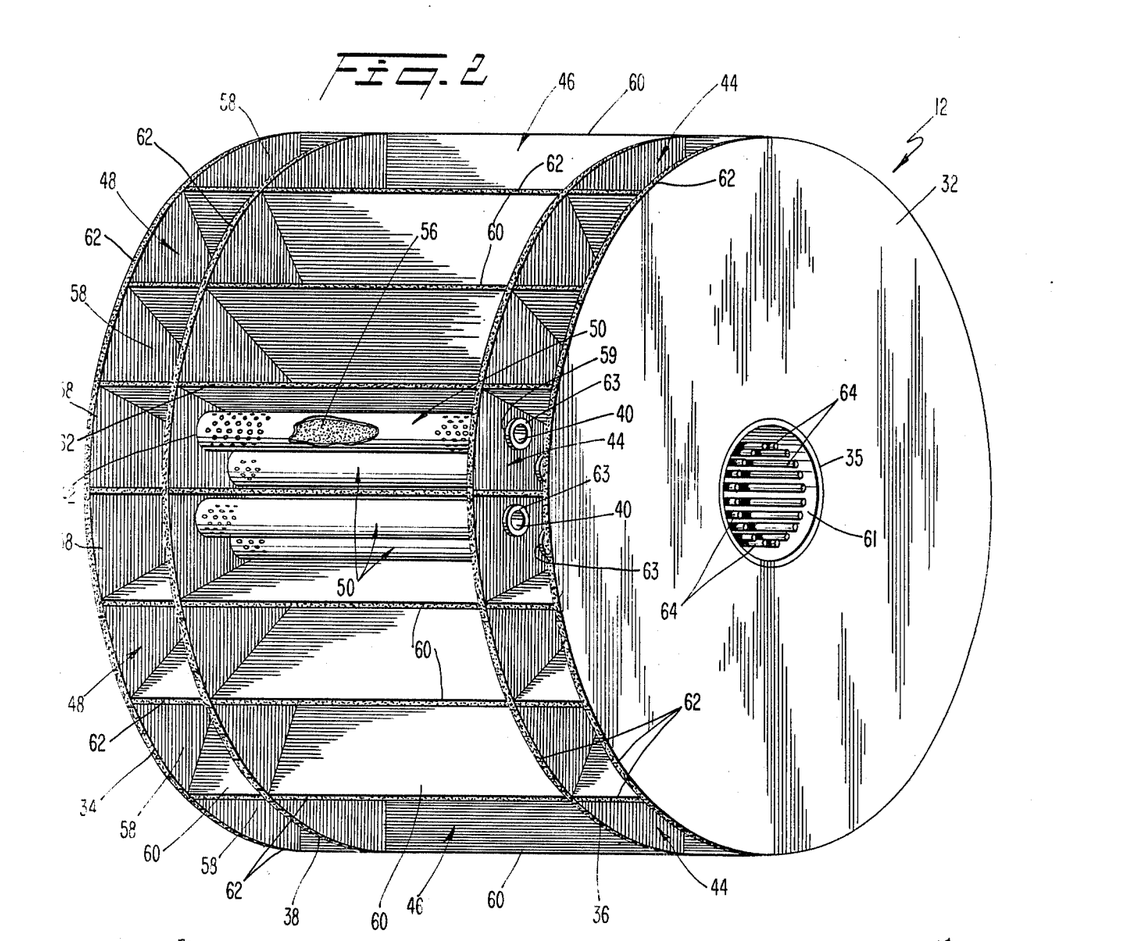
FIG. 2 is a perspective view of the rotor unit of the apparatus of the first embodiment.

The rotor unit 12 of the horizontally-oriented apparatus of the invention is shown in FIG. 2 and includes a front end plate 32 and a rear end plate 34 having central holes 35. The end plates close off the axial ends of the rotor unit while permitting a drive shaft 37, shown in FIG. 9, to extend into the rotor unit through the holes 35. Returning to FIG. 2, two supporting plates 36, 38 also having central aligned holes are mounted perpendicular to the rotor unit axis and parallel to the front and rear end plates 32, 34. These supporting plates 36, 38 separate the rotor unit into three axially-spaced sections, which are designated end sections 44, 48, and central section 46. The supporting plate 36 has additional holes 40 which are aligned with corresponding holes 42 in the supporting plate 38. Containers 50 are mounted between the supporting plates with the opposite ends being received in the holes 40, 42 in the plates 36, 38.

Figure 3:
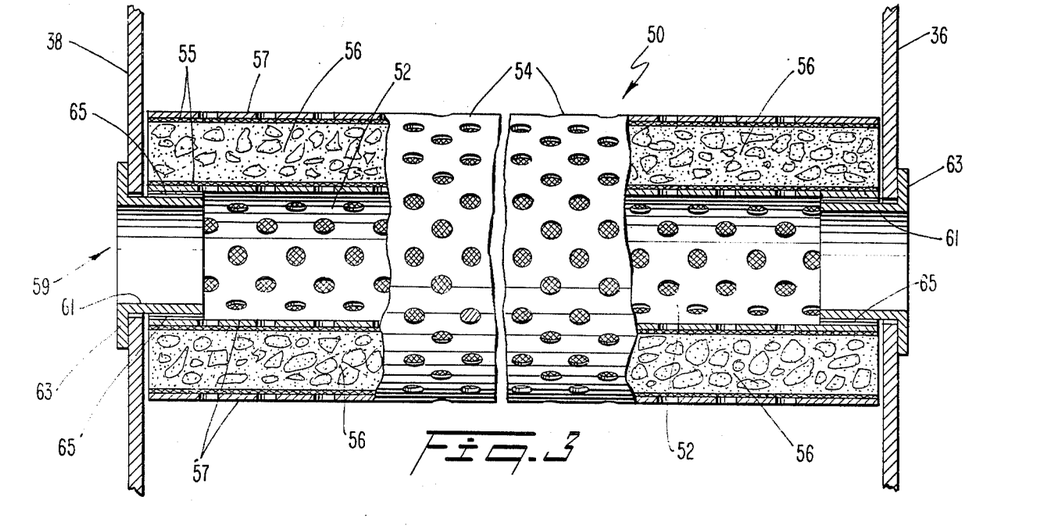
FIG. 3 is a sectional view of a container and the connection between the container and a supporting plate of the apparatus.

As shown in FIG. 3, each container 50 has an inner cylindrical wall 52 and an outer cylindrical wall 54. These walls 52, 54 are each formed of a two-layer construction including a screen or mesh layer 55 adjacent adsorbent material 56 and a perforated sheet layer 57 adjacent the screen and remote from the adsorbent material 56. The adsorbent material 56, such as charcoal, fills the annular section of the container 50 between the inner and outer walls 52, 54 such that none of the material 56 is allowed to escape from the container 50 during operation of the apparatus 10. The container walls 52, 54 allow gas and regenerant to pass through the adsorbent material 56 in the container 50 by passing through the outer and inner walls of the container. Each of the ends of every container 50 is connected to the supporting plate 36 or 38 adjacent thereto through an end support 59 having a hollow cylindrical support wall 61 and an annular mounting flange 63. Seals 65 are provided between the inner wall 52 of the container and the support wall 61 to seal the container against leakage through their ends. This connection permits flow of gases and fluids between the end sections 44, 48 and the central section 46 through the containers 50 and the adsorbent material 56 therein. Only a few containers 50 are illustrated in FIGS. 2 and 4, to avoid obscuring other parts of the apparatus. However, it should be understood that the containers 50 are preferably regularly spaced around the entire circumference of the rotor unit 12. In addition, the bed depth of the adsorbent in each container 50 will dictate the size of the container as well as the number of containers to be employed for any given process.

The rotor unit 12 is radially divided into a plurality of distinct compartments 58 by plates 60 extending radially from the rotor unit axis and axially between the end plates 32, 34. The specific number of compartments 58 employed depends on the geometry of the rotor unit 12 and size of the containers 50. Sixteen to twenty-four compartments can typically be provided. Each of the radial compartments 58 includes a portion of the central section 46 and the two end sections 44, 48. Cylindrical sleeve 61 extends between the openings in the end plates 32, 34 to prevent gas or liquid from passing out of the radial inner end of the compartments 58. This sleeve 61 is connected to the drive shaft 37 at one end and is mounted with bearings 67, FIG. 9, in bearing housings 69 at each end of the rotor unit 12 to transmit drive from the shaft to the rotor unit.

All exposed edges of the end plates 32, 34 and supporting plates 36, 38, and the outer edges of radial plates 60 are lined with sealing material 62, such as Teflon and non-corrosive metal seals, to prevent leakage of fluid from the compartments during operation of the apparatus. It will be understood that small amounts of leakage will be tolerated in the preferred embodiment due to the total enclosure of the rotor unit by the casing.

By this construction, a plurality of substantially identical independent compartments 58 are provided around the rotor unit axis such that compartments exposed to the gas treatment process are totally insulated from compartments undergoing regeneration.

Figure 9:
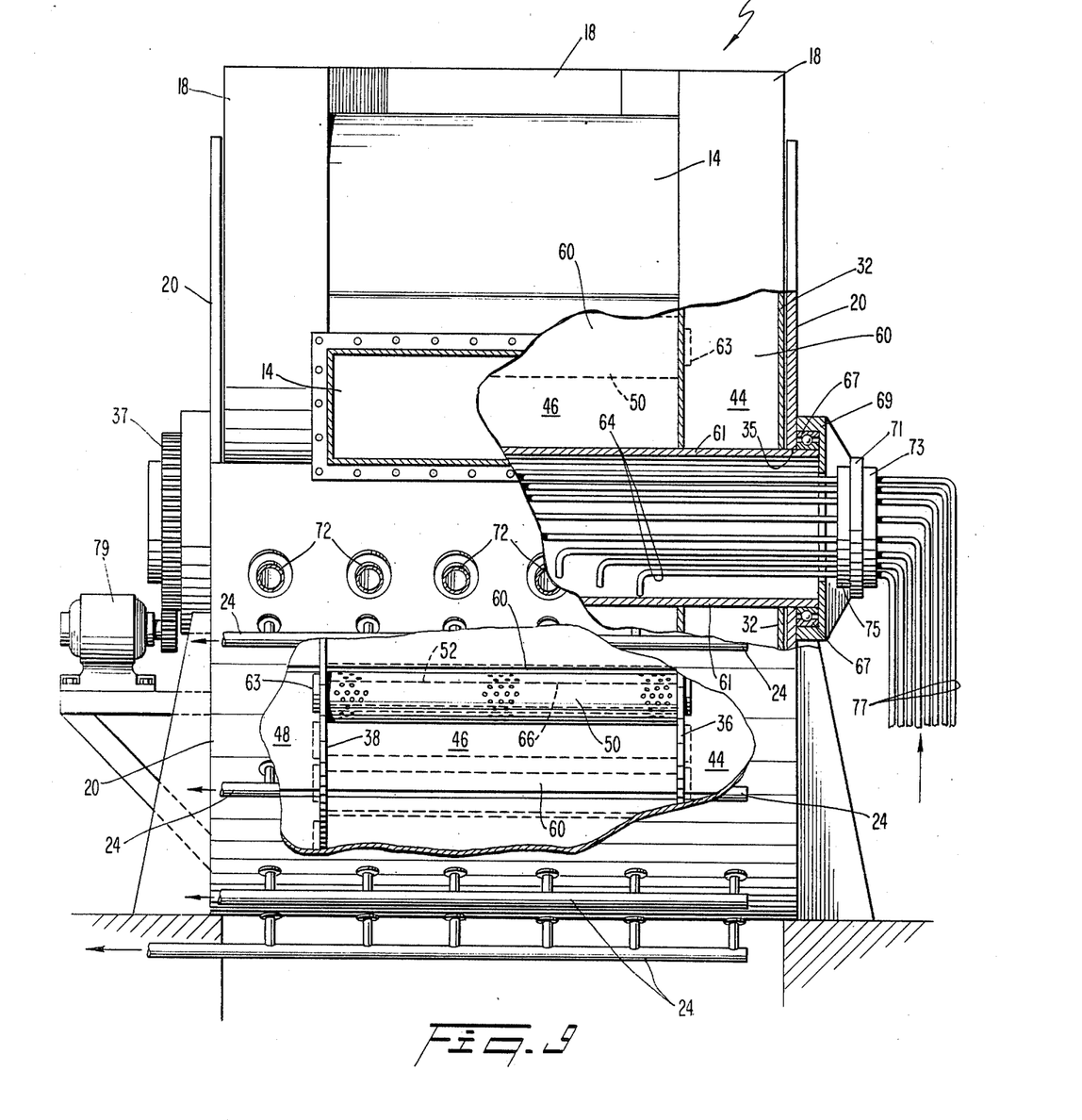
FIG. 9 is a front elevational view partially cut away of the apparatus according to the first embodiment.

As illustrated in FIG. 9, piping 64 is connected to each of the radial compartment central sections 46 through the inner cylindrical sleeve 61 at the inner circumferential surface of the rotor unit for feeding a regenerant solution into the compartment central sections 46 during regeneration. The piping 64 rotates with the rotor unit 12 and is connected to outside feed lines through a hub 71 mounted adjacent the bearing housing 69. The hub 71 includes a non-rotatable outer portion 73 connected to the casing 20 of the apparatus and to the outside feed lines 77, and a rotatable inner portion 75 sealingly connected to the outer portion 73 and rotatable with the piping 64 and the rotor unit 12. Only one set of piping 64 is shown in FIG. 9, but it is to be understood that a set of piping is provided for each compartment 58 which connects the compartment to the hub 71.

When compartments rotate into the regeneration zone, the piping 64 connected to the compartments connect with the outlets of the outside feed lines 77 within the hub 71 and fluid passes into the compartments 58. This provides the regenerant to the compartments as discussed more fully below.

The shaft 37 is mounted at the end of the apparatus 10 opposite the feed lines 77 and is connected between a drive motor 79 and the cylindrical support wall 61 so as to transmit drive to the rotor unit 12 in a counterclockwise direction 29 as shown in FIG. 4.

The operation of the continuous gas treatment apparatus will be described with reference to FIGS. 4 through 9.

As shown in FIG. 4, the volume filled by the rotor unit 12 is divided into several stationary zones. As mentioned above, the gas treatment zone extends outwardly from the rotor axis and from point 23 at the bottom edge of inlet duct 14 to the point 17 at the bottom edge of outlet duct 16 in the clockwise direction.

Figure 5:
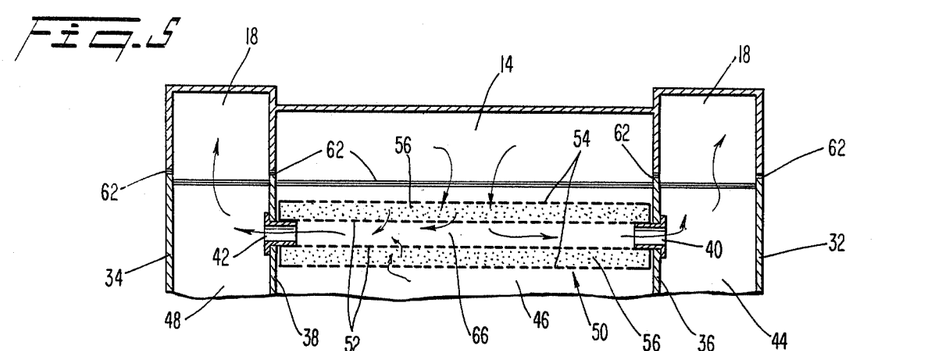
FIG. 5 is a sectional view of the rotor unit of the apparatus of the first embodiment taken along line I—I of FIG. 3.

A regeneration zone extends from point 27 at the bottom edge of pipes 74 to point 25 at the bottom edge of pipes 72 in the clockwise direction. Two additional zones, which are discussed more fully below, extend between points 25 and 23, and points 17 and 27, respectively. Untreated gas, such as flue gas, is supplied through the gas inlet duct 14 from which it enters the central sections 46 of the compartments 58 that are exposed to the duct 14 between points 21 and 23. Seals 62 on the outer edges of the end plates 32, 34, supporting plates 36, 38 and radial plates 60 of the rotor unit 12 prevent gas from escaping from the prescribed gas treatment zone and isolate the compartments in the zone from all other compartments. As shown in FIG. 5, gas received in the central sections 46 of the compartments passes through the outer cylindrical walls 54 of the containers 50 which are supported in the central sections 46 by supporting plates 36, 38. The gas then passes through the adsorbent and the inner cylindrical walls 52 of the containers into the open passages 66 in the centers of the containers. The open passages 66 lead through the holes 40, 42 in the supporting plates 36, 38 at the axial ends of the containers 50 and treated gas passing therethrough is exhausted from the containers 50 into the axial end sections 44, 48 of the compartments 58 in the gas treatment zone. The once-treated gas exits the end sections 44, 48 of the compartments 58 at the outer circumference of the rotor unit and enters the crossover duct 18 between points 21 and 23.

Figure 6:
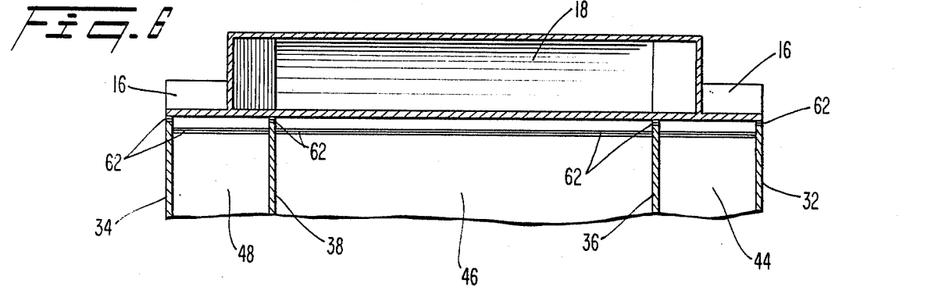
FIG. 6 is a sectional view of the rotor unit taken along line II—II of FIG. 3.

The gas received in the crossover duct is carried therein to a second gas treatment portion extending between points 17 and 19 of the rotor unit circumference. Between points 21 and 19, the gas is confined to the crossover duct and is not exposed to the rotor unit. This crossover step is shown in FIG. 6.

Figure 7:
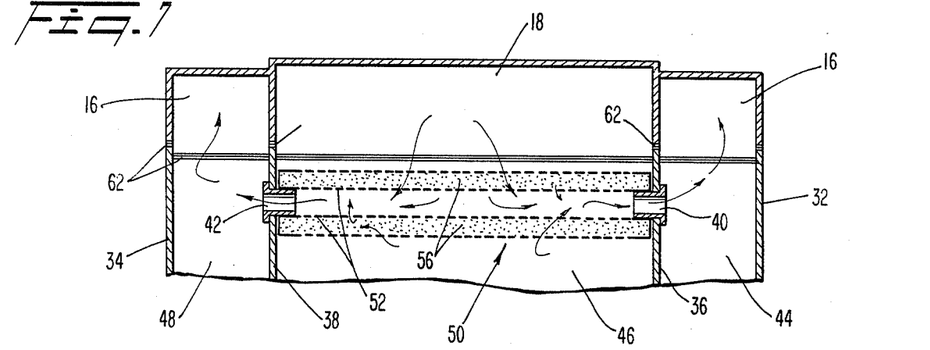
FIG. 7 is a sectional view of the rotor unit taken along line III—III of FIG. 3.

The gas in the duct 18 is guided into the central sections 46 of the compartments 58 rotating through another portion of the gas treatment zone exposed to the duct 18 between points 17 and 19, shown in FIG. 7, whereat a second adsorption process is performed. The gas passes through the adsorbent material 56 in the containers 50 of the compartments 58 and into the outer axial sections 44, 48 of the compartments 58. The twice-treated gas then exits the rotor unit through the outlet duct 16.

The rotor unit 12 continuously rotates in the direction of arrow 29 shown in FIG. 4 at a desired speed during the gas treatment operation such that all of the compartments 58 of the rotor unit 12 are repetitively cycled through the gas treatment zone. The rotational speed employed depends on the process conditions and may vary depending on such specific factors as (a) the required time for regeneration, (b) the removal efficiency required and concentration of material in the gas stream, and (c) the gas stream or throughput.

Figure 8:
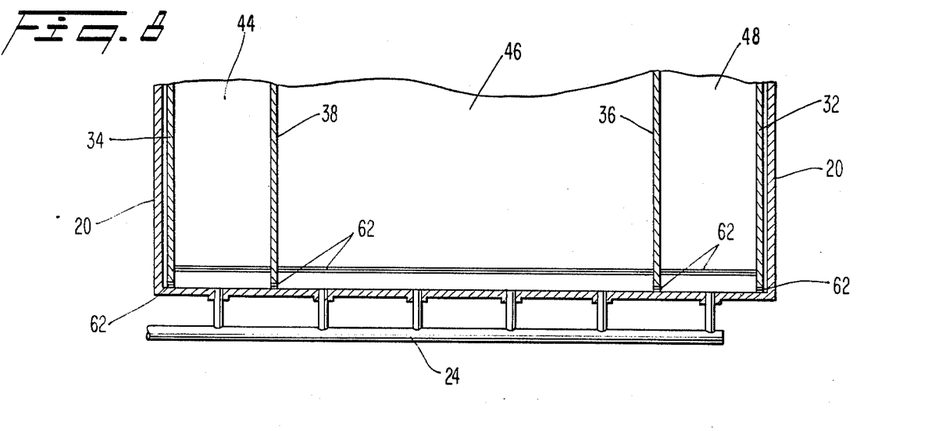
FIG. 8 is a sectional view of the rotor unit taken along line IV—IV of FIG. 3.

Regeneration of the adsorbent material is accomplished while the compartments 58 supporting the adsorbent material 56 rotate through the regeneration zone. A regenerant is supplied to the compartments 58 rotating through the zone through piping 64 connected with the compartments and fills them to the depth indicated at 68 in FIG. 4, so that the containers 50 are permitted to soak in the regenerant as the drum rotates. In this manner, desired constituents or impurities are removed from the adsorbent material 56 and are broken down and carried away with the regenerant when it is drained from the compartments by piping 24 in the casing, as shown in FIGS. 8 and 9. In addition, the casing 20 is fluid-tight to prevent the regenerant solution 68 from leaking out of the apparatus 10.

Once the adsorbent material has been regenerated, it is once again ready for exposure to the gas treatment zone. As the rotor unit 12 revolves, the compartments 58 rotate into the gas treatment zone and the rotor cycle is repeated.

The present invention provides for intermediate steps that may be necessary in the preparation of the adsorbent material for either regeneration or the adsorption process. For example, adsorbent material which is rotated out of the gas treatment zone 20 may require cooling if a liquid regenerant is being used in order to prevent steaming of the regenerant. In such a case, cool air may be supplied to compartments 58 rotating counter-clockwise between points 23 and 25 out of the gas treatment zone such as by pipes 72 and 74 to cool the adsorbent material carried in the compartments 58.

After regeneration, the adsorbent material may require subsequent treatment prior to use in the gas treatment zone. For example, drying of the adsorbent material may be necessary prior to its use in the gas treatment process such as where activated carbon is employed as the adsorption material to allow for better adsorption properties prior to the material being placed back into the adsorption process. The drying is carried out by supplying hot air through piping 74 to the compartments rotating past a second intermediate zone defined between points 27 and 17 in FIG. 4 on the rotor unit circumference.

The operation of the device permits continuous treatment of gas as well as the continuous regeneration of adsorbent material employed in the process. The apparatus 10 is timed to rotate the unit 12 as required to treat the desired quantity of gas by adsorption of impurities and then allow sufficient regeneration time to recycle the adsorbent. In addition, the size of either the gas treatment zone or the regeneration zone can be varied to suit the requirements of the process employed.

Figure 10:
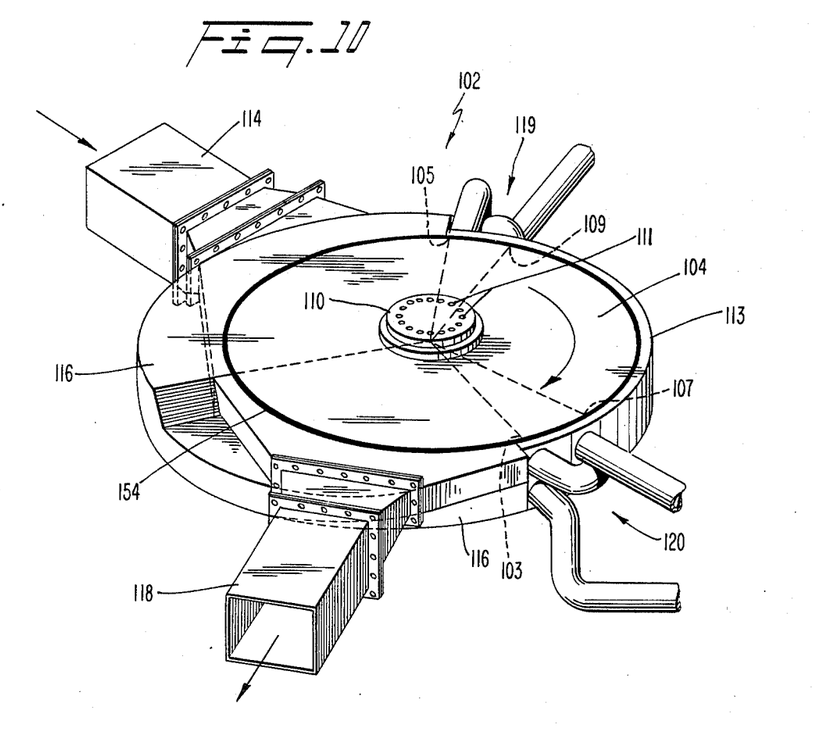
FIG. 10 is an isometric view of a second embodiment of the continuous gas adsorption separation apparatus.
Figure 11:
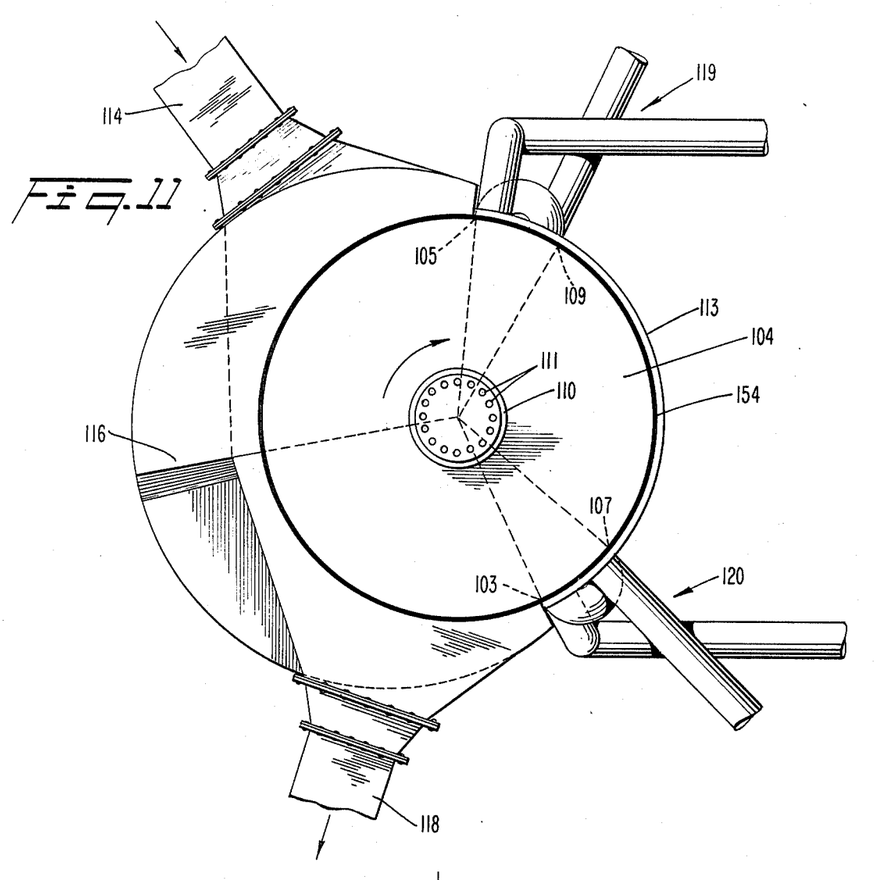
FIG. 11 is a plan view of the apparatus of the second embodiment.

A second embodiment of the invention is illustrated in FIGS. 10-15. The apparatus as generally shown in FIG. 10 basically differs from the embodiment discussed above in that the axis of the rotor unit 104 of this second embodiment is oriented vertically.

The apparatus 102 as shown in FIGS. 10 and 11 again includes a gas treatment zone extending in the direction of travel of the rotor unit between points 103 and 105, a regeneration zone extending between points 109 and 107, and intermediate zones extending between points 105 and 109 and between points 107 and 103. Untreated gas is fed into compartments rotating through a first portion of the gas treatment zone exposed to the inlet duct 14. The gas passes through adsorbent material carried in the compartments and passes out of the rotor unit 104 into crossover duct 116. The once-treated gas is then fed into compartments rotating through another portion of the gas treatment zone exposed to the crossover duct 116 and undergoes a second adsorption process before being delivered from the apparatus through the outlet duct 118.

The rotor unit 104 is supported on stationary outer hub assemblies 110, 112 and is continuously driven to repetitively present the compartments at the respective zones of the apparatus. The outer hub assembly 110 also supports regenerant solution outer feed lines 111 which supply regenerant to the inner piping 160, FIG. 12, supported in each compartment. Means are provided in the outer hub assemblies 110, 112 to connect the outer stationary feed lines to the piping 160 of the compartments which are passing through the regeneration zone.

A shell 113 is provided adjacent the rotor unit around the circumferential area of the rotor unit which is not exposed to the gas ducts 114, 116, 118. Piping 119, 120, necessary for intermediate treatments of adsorbent material, passes through the shell 113 at the desired locations around the rotor unit.

Figure 12:
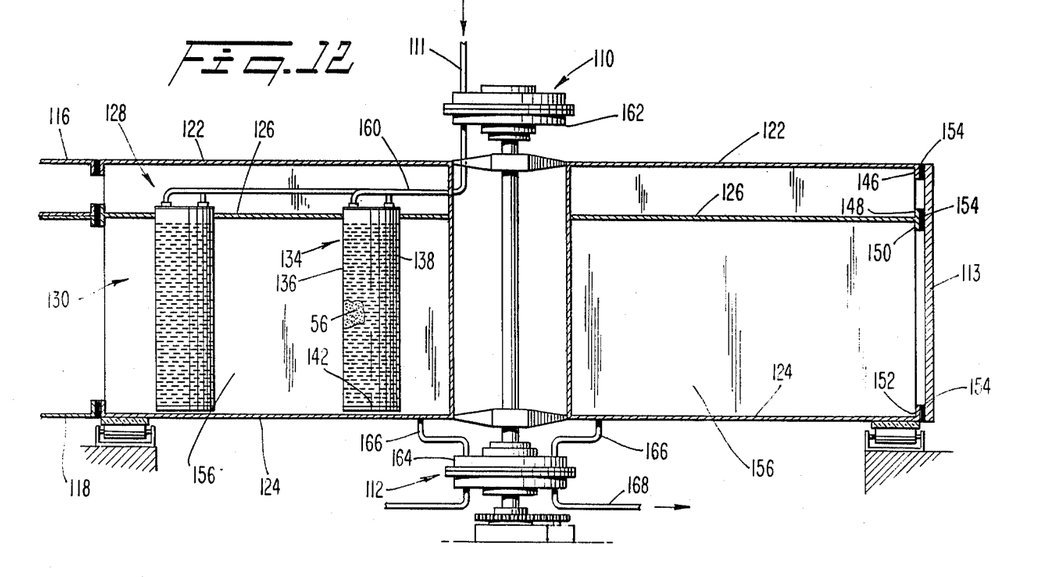
FIG. 12 is a side sectional view of the rotor unit of the apparatus according to the second embodiment of the invention.

The vertical rotor unit 104 of the second embodiment as shown in FIG. 12 comprises two circular end walls 122, 124, and one circular supporting plate 126 intermediate the end walls 122, 124. The supporting plate 126 defines an upper section 128 and a lower section 130 in the rotor unit.

Figure 13:
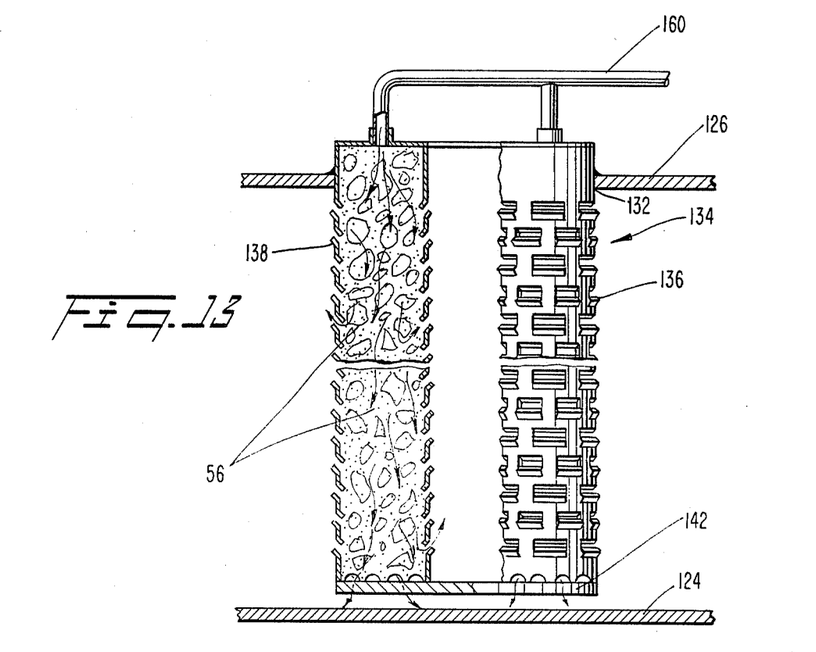
FIG. 13 is a side view of a container of the rotor unit of the apparatus according to the second embodiment of the invention.

Holes 132 are provided in the supporting plate 126 and a container 134 is supported by the plate 126 at each hole 132. The containers 134 are similar to the containers 50 used in the above embodiment in that adsorbent material 56 is supported in an annular cylindrical section of the containers 134 between inner and outer cylindrical walls 136, 138 which are permeable to gas and fluids. However, because only one supporting plate 126 is employed, only one axial end of each container extends into the upper section 128 of the rotor unit and therefore the axial end 142 located in the lower section 130 is closed. In addition, as shown in FIG. 13, the containers 134 are connected directly to the plate 126 without the use of a separate end support as is employed in the first embodiment. This construction permits a direct connection between the annular adsorbent containing portions of the containers and piping 160 and enables regenerant solution to be fed directly into the adsorbent containing portions of the containers during regeneration. In addition, the construction permits gas fed into the lower section 130 of the rotor unit 104 to pass through the adsorbent material held in the containers, through the inner passage 144 and into the upper output section 128, thereby submitting the gas to an adsorption process.

The end walls 122, 124 shown in FIG. 12 are provided with flanges 146 and 152 around their circumferences which have seals 154 connected to their outer circumferential surfaces. In addition, supporting plate 126 is provided with two flanges 148, 150 also provided with seals 154 at their outer circumferences. These seals prevent gas leakage during the gas treatment process and fluid leakage during the regeneration process.

Radial plates 156 are employed in the rotor unit to separate the unit 104 into distinct radial compartments as in the above embodiment. This construction insures that the adsorbent material rotating through the different processes will not be exposed to either gas or fluids being used in another process at a different zone of the apparatus.

Regenerant supply piping 160 is mounted in the upper section 128 of each compartment and is connected to an inner hub member 162 of the upper hub assembly 110. The inner hub member 162 rotates with the rotor unit 104 and is sealingly connected to the outer hub assembly to permit fluid feed to the inner piping 160 through outside lines 111. The inner hub member 164 of the lower hub assembly 112 is sealingly connected to the lower hub assembly 112 to permit fluid to be drained from the rotor unit 104 through inner drain lines 166 and outer drain line 168 without leakage.

The regenerant fluid is directed through the inner piping 160 into the top of the annular sections of the containers 134 extending above the supporting plate 126. The fluid flows into the containers 134 and out through the adsorbent material into the lower section 130. The perforations in the containers are sized to retain the regenerant for a short period therein to allow a brief soaking of the adsorbent prior to draining of the fluid, and to permit adequate gas flow through the adsorbent during the adsorption process. Drain piping 166 is connected to each compartment 158 to drain the regenerant and any removed adsorption product after the regenerant has passed through the adsorbent material. The used regenerant is then drained through stationary outer drain line 168 in the lower hub 112 and is either reprocessed or discarded.

The lower flange 152 and the shell wall 116 prevent regenerant from leaking from the lower section 130 when regenerant is supplied to the compartment.

Figure 14:
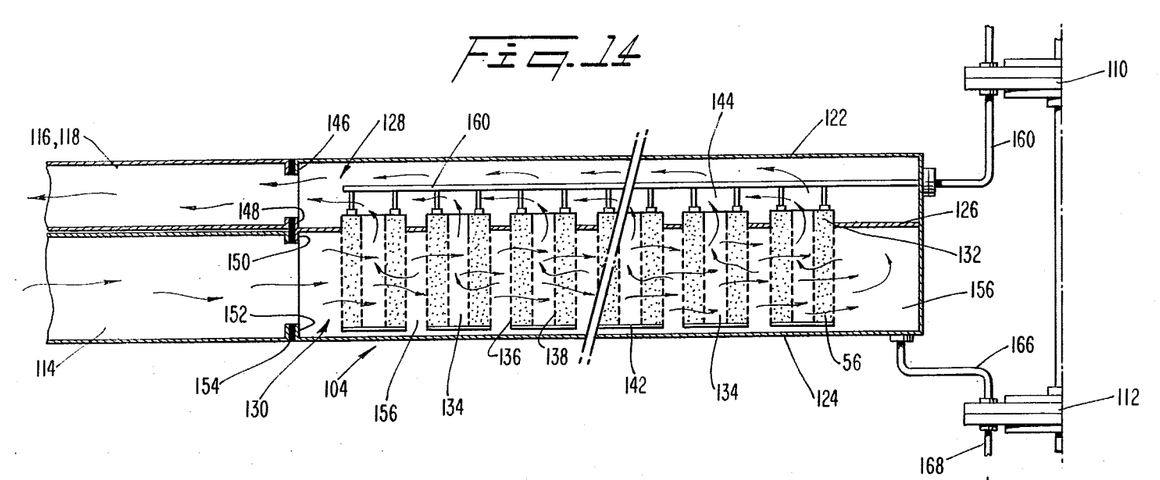
FIG. 14 is a side elevational cross-sectional view of a portion of the rotor unit of the apparatus according to the second embodiment and illustrates the conceptual flow of gas through the apparatus.
Figure 15:
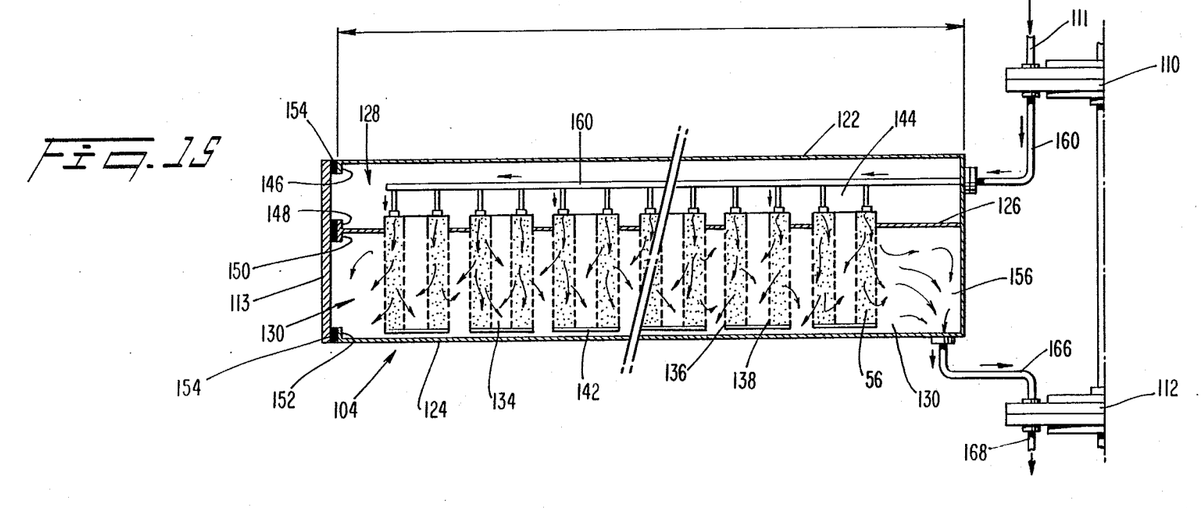
FIG. 15 is the side elevational cross-section as shown in FIG. 7 illustrating the conceptual path of regenerant through the apparatus.

The operation of the second embodiment is similar to the operation discussed above. As shown in FIG. 14, the adsorption process gases flow through the rotor unit 104 from the inlet duct 114 to the crossover or outlet ducts 116, 118 and pass through the adsorbent material 56 in the containers 134 while going from the lower section 130 of the unit to the upper section 128. During regeneration, instead of soaking the adsorbent material as in the first embodiment, a regenerant flows through the material and is drained from the rotor unit 104 as shown in FIG. 15. Both methods permit desired constituents or impurities to be removed from the adsorbent material.

A possible alternative to employing a separate regeneration zone in the embodiments discussed above is to supply a regenerant solution to the containers during the gas treatment process. For example, a regenerant liquid may be constantly directed into the containers to continuously rinse adsorbed products from the material while permitting gas to pass through the containers in the opposite direction. In this manner, a greater volume of gas could be treated since the entire rotor unit would be capable of being exposed to the gas treatment process.

It will be seen that the objects set forth above, among those made apparent from the preceding description, are efficiently attained and, since certain changes may be made in the construction and in carrying out the above method without departing from the scope of the invention, it is intended that all matter contained in the above description or shown in the accompanying drawings shall be interpreted as illustrative only and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of continuously treating gases in an adsorption process comprising the sequential steps of:
    rotating a plurality of compartments at a constant rate about a central axis, each of said compartments having a plurality of permeable hollow containers of adsorbent material,
    feeding untreated gas radially into said compartments and through adsorbent material in said containers thereby treating said gas in an adsorption process,
    withdrawing gas axially from said compartments and feeding said gas radially into said compartment,
    withdrawing said gas from said compartments axially, and
    regenerating the adsorbent material in said containers in preparation for repeating the treatment.

2. The continuous gas treatment method of claim 1, wherein the gas treatment step further includes the steps of:
    feeding untreated gas through adsorbent material in a first group of the compartments passing through said gas treatment zone,
    delivering once-treated gas from said first group of compartments and feeding the once-treated gas through adsorbent material in a second group of the compartments passing through said gas treatment zone thereby submitting the gas to two adsorption processes in said gas treatment zone.

3. The continuous gas treatment method according to claim 1, wherein both of said feeding steps occur simultaneously, so that two groups of compartments are exposed simultaneously to said gas as said compartments are rotated, said gas being supplied only to the compartments in a first of said two groups of compartments, and said gas being supplied only from said first group of compartments to a second of said two group of compartments.

4. The method according to claim 3 wherein said central axis is vertical, and said gas withdrawing step occurs only in a vertically upward direction from said containers.

5. The method according to claim 3 wherein said central axis is horizontal, and said gas withdrawing step occurs at each horizontal end of said containers.

6. The method according to claim 3 wherein said gas during said feeding steps passes from the exterior of said containers to the interior of said containers, and passes through said adsorbent material.

7. A method of continuously treating gases in an adsorption process comprising the sequential steps of:
    rotating a plurality of compartments at a constant rate about a central axis, each of said compartments having a plurality of permeable hollow containers of adsorbent material,
    feeding untreated gas radially into said compartments and through adsorbent material in said containers thereby treating said gas in an adsorption process,
    withdrawing gas axially from said compartments and feeding said gas radially into said compartments, both of said feeding steps occurring simultaneously so that two groups of compartments are exposed simultaneously to said gas as said compartments are rotated, said gas being supplied only to the compartments in a first of said two groups of compartments, and said gas being supplied only from said first group of compartments to a second of said two groups of compartments, withdrawing said gas from said compartments axially, and regenerating the adsorbent material in said containers in preparation for repeating the treatment, said regenerating step including sequentially filling said compartments with a regenerating liquid to submerge said adsorbent material in said liquid.

8. An apparatus for the continuous adsorption of constituents from gas streams, comprising
- a cylindrical rotor unit having an outer circumference and being mounted for rotation about a central axis, the rotor unit including a plurality of compartments herein spaced about said central axis, each of said compartments including an opening at a radially outer side thereof,
- a plurality of hollow containers mounted in said compartments, said containers having walls which are fluid permeable and which include means to contain adsorbent material,
- stationary duct means extending around at least a portion of the circumference of said rotor unit and in fluid sealing relation with the openings of those of said compartments facing said duct means, said duct means including an inlet duct, a crossover duct, and a outlet duct,
- rotary duct means in said rotor unit to conduct gas from said inlet duct to said crossover duct and from said crossover duct to said outlet duct such that gas being conducted from said inlet duct to said crossover duct passes through adsorbent material in a plurality of said containers for a first adsorption process and gas being conducted from said crossover duct to said outlet duct passes through adsorbent material in a plurality of said containers for a second adsorption process,
- regenerating means on said rotor unit to regenerate adsorbent material in said containers while said rotor unit rotates said container between said gas inlet duct and said gas outlet duct.

9. The apparatus according to claim 8, further comprising:
- a first end plate mounted at one axial end of said rotor unit and a second end plate mounted at another axial end of said rotor unit, said end plates being substantially perpendicular to said central axis and having openings at the central axis through which said drive means passes, and
- said compartments being formed by a plurality of plates extending radially from said central axis and axially between said first and second end plates.

10. The apparatus according to claim 9, further comprising:
- a pair of supporting plates mounted in said rotor means between said end plates, and being substantially perpendicular to said central axis, said supporting plates being arranged to form a compartment inlet section and a compartment outlet section adjacent said end plates, each supporting plate having a plurality of holes to provide fluid communication between said compartment inlet section and compartment outlet section,
- said hollow containers being mounted between said supporting plates in alignment with said holes with the interior of said hollow container communicating through said holes with said compartment inlet section and said compartment outlet section.

11. The apparatus according to claim 8, further comprising:
- a shell assembly extending around at least a portion of the periphery of said rotor unit and in fluid sealing relation with those of said compartments facing said shell assembly, and
- supply means to supply regenerant to the containers being rotated through said regeneration zone, said regenerant being retained in said regeneration zone by said shell assembly to allow said regenerant to remove elements from the adsorbent material which have been removed form gases passing through the treatment device, said shell assembly having drain means to drain said regenerant from said regeneration zone.

12. The apparatus according to claim 8 wherein:
- said rotary duct means includes a series of compartments spaced around the circumference of said rotor unit, said hollow containers extending substantially parallel to said central axis, and a pair of end sections spaced around the circumference of said rotor unit at opposite axial ends of said compartments, the interior of said containers being in fluid communication with said end sections,
- said inlet duct being aligned with said compartments, said outlet duct being aligned with said end sections and said crossover duct communicating between said compartments and said end sections.

13. The apparatus according to claim 8 wherein said stationary duct means extends around a first portion of the periphery of said rotor unit, and said regenerating means is positioned to regenerate said adsorbent material at locations along the remaining portion of the periphery of said rotor unit.

14. The apparatus according to claim 8 wherein said central axis is substantially vertical.

15. The apparatus according to claim 8 wherein said central axis is substantially horizontal.

16. Apparatus for continuously treating gas in an adsorption process comprising:
- a rotor unit having an outer circumference;
- means mounting said rotor unit for rotation about a central axis;
- a first radial end plate mounted at one axial end of the rotor unit and a second radial end plate mounted at the other axial end of the rotor unit;
- a plurality of longitudinal plates extending radially from adjacent the central axis and axially between the first and second end plates thereby forming a plurality of compartments in the rotor unit;
- a pair of supporting plates mounted radially in each of said compartments adjacent the end plates, the pair of supporting plates forming a central compartment section and a pair of compartment end sections in each compartment, each of the supporting plates having a plurality of holes to provide fluid communication between the central compartment section and the compartment end section adjacent thereto;
- a plurality of hollow containers having an outer fluid permeable wall and an inner fluid permeable wall with a central interior passage extending between opposite ends of the container, said containers each having adsorbent material filled between the outer and inner container walls, each of the containers extending between holes in the supporting plates with said central interior passages aligned with the holes in the supporting plates;

a gas inlet duct and a gas outlet duct and a crossover duct between said inlet and outlet ducts, said ducts covering a first portion of the rotor unit outer circumference;

said gas inlet duct being positioned to deliver gas to a plurality of said compartments between said supporting plates, said crossover duct being positioned to receive gas from said rotor between said supporting plates and said end plates and delivering the gas to a plurality of said compartments between said supporting plates, said gas outlet duct being positioned to receive gas from said rotor between said supporting plates and said end plates;

a shell enclosing the remaining portion of the circumference of the rotor unit; and means cooperating with the shell to regenerate the adsorbent material carried in the containers being rotated through the regeneration zone thereby allowing the same adsorbent material to be repetitively employed in the continuous adsorption process.

17. The apparatus according to claim 16 wherein said central axis is horizontal.

18. Apparatus for continuously treating gas in an adsorption process comprising:

a rotor unit having an outer circumference;

means mounting said rotor unit for rotation about a central axis;

a first radial end plate mounted at one axial end of the rotor unit and a radial end plate mounted at the other axial end of the rotor unit;

a plurality of longitudinal plates extending radially from adjacent said central axis and between said end plates thereby forming a plurality of compartments in the rotor unit;

a supporting plate mounted in the rotor between the end plates and extending substantially perpendicular to the central axis, the supporting plate forming a first rotor unit section between one end wall and the supporting plate, and a second rotor unit section between the other end wall and the supporting plate, said supporting plate having a plurality of holes therein to provide fluid communication between the first and second rotor unit sections;

a plurality of hollow containers having an outer fluid permeable wall and an innner fluid permeable wall with a central interior passage extending between opposite ends of the container, said containers each having adsorbent material filled between the outer and inner container walls, each of said containers being mounted on the supporting plate through one of the holes and extending into the first rotor unit section;

a gas inlet duct and a gas outlet duct and a crossover duct between said inlet and outlet ducts, said ducts covering a first portion of the rotor unit outer circumference;

said gas inlet duct being positioned to deliver gas to a plurality of said compartments of the first rotor unit section, said crossover duct being positioned to receive gas from the second rotor unit section and to deliver the gas to a plurality of said compartments of the first rotor unit section, said gas outlet duct being positioned to receive gas from said second rotor unit section;

a shell enclosing the remaining portion of the circumference of the rotor unit; and means cooperating with the shell for supplying a regeneration fluid to regenerate the adsorbent material thereby allowing the same adsorbent material to be repetitively employed in the continuous adsorption process.

19. The apparatus according to claim 18 wherein said central axis is vertical.

20. The apparatus according to claim 19 wherein said means for supplying regeneration fluid includes conduit means for conducting regeneration fluid to said containers and includes drain means for removing said fluid from said first rotor unit section.

* * * * *